Nov. 15, 1949     E. T. MOSBY     2,488,316
ADJUSTABLE MIRROR SUPPORT
Filed July 5, 1947
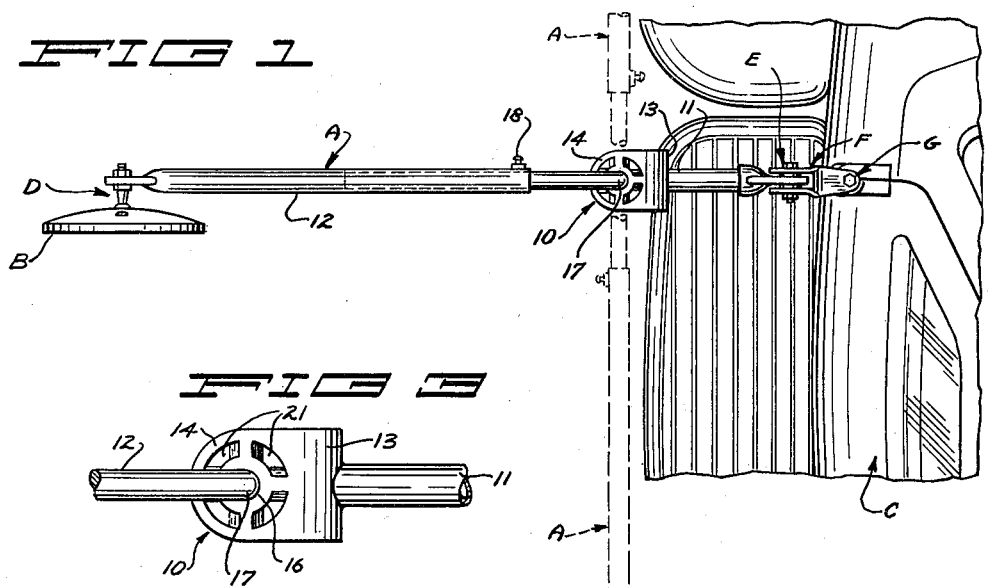
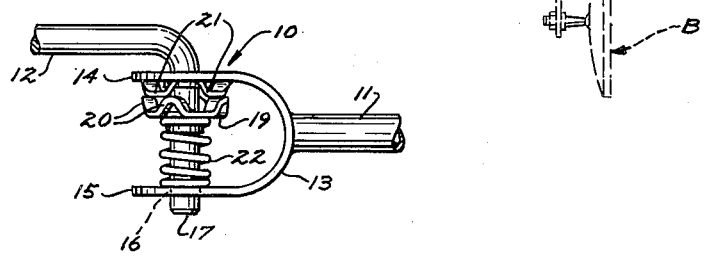
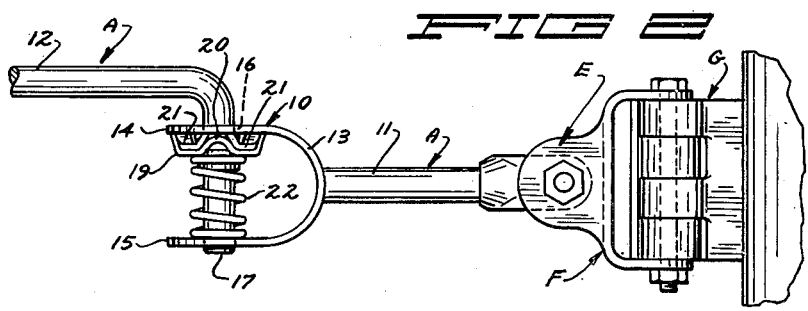
Inventor
EDGAR T. MOSBY Patented Nov. 15, 1949

2,488,316

UNITED STATES PATENT OFFICE 2,488,316

ADJUSTABLE MIRROR SUPPORT

Edgar T. Mosby, Minneapolis, Minn.

Application July 5, 1947, Serial No. 759,127

3 Claims. (Cl. 248—289)

This invention relates generally to improvements in rear view mirrors for trucks and the like, and more particularly to an improved adjustable support for such mirrors.

The ordinary rear vision mirror as used on large trucks must be supported from the cab on a laterally out-thrust arm of sufficient length to allow the operator to obtain a view of the road behind past the side of the truck, and with sufficient adjustments to permit the mirror to be adjusted to any required angle. The mirror supporting arm is therefore of such length, and so located, that in maneuvering the truck in cramped quarters, for loading and the like, the arm all too frequently is struck by or strikes an adjacent truck and becomes broken or otherwise damaged. In fact there is a considerable replacement expense involved.

The primary object of my invention is to provide a support for this type of mirror having a joint which will release when the arm is struck in any way, allowing the arm to fold either forwardly or rearwardly without breaking, and which joint is further so constructed that the arm may be swung back quickly to its initial position and accurately bring the mirror back to its adjusted position, without further adjustment. Still another object is to provide a support of this character which will permit the mirror to be swung to a folded position alongside the cab of the truck when not in use, and which will require no tools, replaceable shear pins or extra equipment of any kind for its operation.

These and other more detailed and specific objects will be disclosed in the course of the following specification, reference being had to the accompanying drawings, in which—

Fig. 1 is a plan view of a mirror and support embodying my invention, shown on a portion of a truck cab, and indicating in dotted lines how the arm can swing either forwardly or rearwardly.

Fig. 2 is an enlarged rear elevational view of a portion of the arm showing the novel joint therein.

Fig. 3 is a fragmentary plan view of the joint.

Fig. 4 is a fragmentary rear elevational view, with the joint in releasing position.

Referring now more particularly and by reference characters to the drawing, A designates generally a supporting arm assembly by which a conventional rear view mirror B when in use is supported in laterally out-set relation to the cab C of a truck so that the driver may obtain a view rearwardly alongside the truck body of the road behind. The mirror B as here shown has a conventional ball and socket connection D to the outer end of the arm A, while the inner end of the arm has a likewise conventional pivot connection E to a bracket F which is secured to the door hinge G of the cab, or otherwise firmly anchored on the truck. The connection D and pivot E permit the mirror to be adjusted to the required angle as will be understood, it being noted that pivot E permits the mirror to be swung up or down.

In accordance with my invention I provide the arm A with a joint or release connection which is designated generally at 10 and permits the arm to swing in a substantially horizontal plane, forwardly and rearwardly at its outer, mirror carrying end. The arm A is accordingly divided into two parts, comprising an inner section 11 by which it is attached to the bracket F, and a considerably longer outer section 12 whereon is mounted the mirror B. The inner section 11 is provided at its outer end with a fork 13 having upper and lower vertically spaced arms 14 and 15 having vertically aligned bearing apertures 16. The inner end of the outer arm section 12 has a downwardly turned pivot finger or end 17 which is rotatably mounted through these apertures 16 to thus provide for the forward and rearward swinging action of this outer portion of the arm previously described. As here shown this pivot end 17 is formed at the extremity of a rod which is telescoped into a tubular outer part completing the arm, thus providing for length adjustment of the arm as a whole, and a set screw 18 locks the parts in any adjustment as will be readily apparent. I do not, of course, limit myself to this precise arrangement.

The pivot connection 10 further includes a strain release or indexing mechanism comprising a collar member 19 which is firmly anchored on the pivot finger 17 between the fork arms 14 and 15, and which has radial undulations or spaced, upwardly rounded teeth 20 cooperating with corresponding, downwardly punched radial teeth 21 on the upper arm 14. An expansion coil spring 22 placed around the pivot finger 17 is braced between the collar 19 and the lower arm 15 and thus normally and yieldably urges the finger upward and holds the teeth 20—21 in mesh as seen in Fig. 2.

It will now be understood that, should the arm A be struck, or forcibly moved from its normal out-thrust position that the teeth 20 will cam out of mesh with the teeth 21 urging the pivot finger 17 downwardly against the tension of the spring 22 as seen in Fig. 4 and the arm may then swing either forwardly or rearwardly to the folded positions indicated in dotted lines in Fig. 1, without damage. When the arm is then swung back to normal position the teeth act as an index to ensure its return to position without further adjustment, and the mirror is again properly located and angled for rear vision.

It is understood that suitable modifications may be made in the structure as disclosed, provided such modifications come within the spirit and scope of the appended claims. Having now therefore fully illustrated and described my invention, what I claim to be new and desire to protect by Letters Patent is:

1. A rear vision mirror assembly for a truck, comprising an arm adjustably mounted at one end on the truck and normally extending laterally outward therefrom, a mirror on the outer part of the arm, said arm comprising inner and outer sections, a fork on the inner section of the arm having upper and lower portions and said portions having openings, and a pivot finger on the outer arm portion journaled through said openings whereby the outer section of the arm may fold forwardly or rearwardly, a collar member on the said pivot finger, cooperating index teeth on the collar member and the adjacent upper portion of the fork, and a spring operatively arranged to yieldably hold said teeth in mesh to thereby yieldably hold the outer arm section in an adjusted position.

2. A rear vision mirror assembly for a truck comprising an arm adjustably mounted at one end on the truck and normally extending laterally outward therefrom, a mirror on the outer part of the arm, said arm comprising inner and outer sections, a fork on the inner section of the arm having upper and lower portions, the outer arm section being connected to the inner arm section between said upper and lower fork portions and swingable forwardly and rearwardly, and a spring actuated mechanism disposed between said upper and lower fork portions and yieldably resisting both forward or rearward folding movements of the outer arm section.

3. A rear vision mirror assembly for a truck comprising, in combination, an arm mounted at one end on the truck and normally extending laterally outward therefrom, a mirror on the outer part of the arm, said arm comprising inner and outer sections, a fork on the inner section of the arm having upper and lower fork arms and said fork arms having openings, a pivot finger on the outer arm portion journaled vertically through said openings whereby the outer section of the arm may fold forwardly and rearwardly, a collar member anchored on said pivot finger between the fork arms and having spaced upwardly tapered teeth, complementary teeth on the upper fork arm and tapering downwardly to cooperate with the teeth on the collar member, a spring operatively arranged between the fork arms to hold the teeth in mesh, and the coacting teeth being so shaped that as the outer arm is moved in either a forward or rearward direction the teeth on the collar will slide out of mesh with the teeth on the upper fork arm against the tension of the spring.

EDGAR T. MOSBY.

REFERENCES CITED

The following references are of record in the file of this patent:

UNITED STATES PATENTS

| Number | Name | Date |
|---|---|---|
| 365,158 | Van Duzer | June 21, 1887 |
| 566,521 | Leger | Aug. 25, 1896 |
| 1,410,325 | Kupferman | Mar. 21, 1922 |
| 1,493,609 | Dailey | May 13, 1924 |